United States Patent [19]

Sandstrom et al.

[11] Patent Number: 5,162,425

[45] Date of Patent: * Nov. 10, 1992

[54] FAST CURING RUBBER BLEND

[75] Inventors: Paul H. Sandstrom, Tallmadge; Emil M. Friedman, Cleveland Heights; J. Dale Massie, II, Hudson, all of Ohio; Robert A. Smith, Murrysville, Pa.

[73] Assignee: The Goodyear Tire & Rubber Company, Akron, Ohio

[*] Notice: The portion of the term of this patent subsequent to Oct. 2, 2007 has been disclaimed.

[21] Appl. No.: 590,260

[22] Filed: Sep. 28, 1990

Related U.S. Application Data

[63] Continuation-in-part of Ser. No. 380,046, Jul. 14, 1989, Pat. No. 4,960,819, which is a continuation-in-part of Ser. No. 748,286, Jun. 24, 1985, abandoned.

[51] Int. Cl.$^5$ ............... C08L 9/00; C08L 9/06; C08L 39/08
[52] U.S. Cl. ............... 524/516; 524/526; 525/192; 525/203
[58] Field of Search ............... 524/516, 526; 525/192, 525/203

[56] References Cited

U.S. PATENT DOCUMENTS 3,114,409 12/1963 Iknayan et al. ............... 152/330
4,869,968 9/1989 Coran et al. ............... 128/495
4,960,819 10/1990 Sandstrom ............... 524/516

FOREIGN PATENT DOCUMENTS 1263290 3/1968 Fed. Rep. of Germany ...... 525/203

Primary Examiner—Ralph H. Dean, Jr.
Attorney, Agent, or Firm—Alvin T. Rockhill

[57] ABSTRACT

It is highly desirable to be able to cure rubbers quickly since the amount of energy required for the curing process is reduced and the number of articles that can be cured in a mold in a given time is increased. In other words, the cycle time needed to cure articles made from such a rubber is reduced and the throughput of a mold utilized in curing such a rubber is increased. Unfortunately, most attempts to accelerate the cure rate of rubber have resulted in the rubber having poor scorch safety. The present invention discloses a fast curing rubber blend having excellent scorch safety which comprises: (a) from 50 to 98 weight percent of at least one polydiene rubber, and (b) from 2 to 50 weight percent of at least one vinylpyridine copolymer comprised of repeat units which are derived from a diene monomer and vinylpyridine wherein from 1 to 75 weight percent of the repeat units in said copolymer are derived from vinylpyridine. The rubber blends of the present invention have unexpectedly been shown to have particular utility in improving tire tread traction.

18 Claims, No Drawings

FAST CURING RUBBER BLEND

CROSS-REFERENCE

This is a continuation-in-part of application Ser. No. 07/380,046 filed Jul. 14, 1989, now U.S. Pat. No. 4,960,819. Application Ser. No. 07/380,046, in turn, is a continuation-inpart of application Ser. No. 06/748,286, filed on Jun. 4, 1985.

BACKGROUND

It is highly desirable to reduce the cycle time needed to cure a rubber article since more articles can be cured in a given mold per unit time. Reducing the duration of a cure cycle also generally results in energy savings.

Organic accelerators have been used for many years in order to make rubbers cure more quickly. Aniline was one of the first organic compounds used to accelerate the vulcanization of rubber. However, it was objectionable because of its toxicity. It was later discovered that the reaction product of aniline with carbon disulfide, namely thiocarbanilide, was more effective as an accelerator and less toxic. It then became the first widely used organic accelerator. In 1921, mercaptobenzothiazole was introduced as an accelerator for rubber vulcanization and it is still being used commercially as an accelerator today. Currently, a wide variety of accelerators are being utilized commercially including, thiazole accelerators such as benzothiazyl disulfide and 2-mercaptobenzothiazole; sulfenamide accelerators, such as N-oxydiethylene benzothiazole-2-sulfenamide and n-cyclohexyl-2-benzothiazolesulfenamide; dithiocarbamate accelerators, such as, bismuth dimethyldithiocarbamate, cadmium diethyldithiocarbamate, copper dimethyldithiocarbamate, lead dimethyldithiocarbamate, selenium diethyldithiocarbamate, and zinc dimethyldithiocarbamate; thiuram accelerators, such as, tetramethylthiuram disulfide and tetraethylthiuram disulfide; and thiourea accelerators, such as tetramethylthiuram monosulfide, dimethylethyl thiourea, and trimethyl thiourea. Commercial or organic accelerators of this type can reduce the time required to vulcanize a rubber by at least 50 percent.

The incorporation of an accelerator into a rubber generally results in the rubber having a greater tendency to scorch. Scorch is the premature crosslinking of an elastomer which can render the elastomer totally unsuitable for many applications. Improving a rubber's cure rate without adversely affecting its scorch safety or other properties has proven to be a very formidable problem.

U.S. Pat. No. 3,114,409, to Iknayan relates to a method of improving the adhesion of vinylpyridine copolymer rubber to other rubbers, and more particularly, to the adhesion of copolymers of monovinylpyridines with a major proportion of the diolefin to another rubber, as well as to the improved laminate of the thus obtained.

U.S. Pat. No. 4,869,968, to Coran relates to a rubber article comprising contiguous portions of an isoprene rubber composition and a butadiene rubber composition containing a polymeric activator. Composite articles made from these rubber compositions together with a contiguous portions of a dissimilar rubber compound show greater strength and adhesion as a result of the presence of the activator in the butadiene polymer rubber composition.

DESCRIPTION OF THE DRAWING

The chart relates to tan delta, showing hysteresis values obtained over a temperature range with regard to compositions of the present invention.

SUMMARY OF THE INVENTION

It has been unexpectedly discovered that vinylpyridine copolymers can be blended with polydiene rubbers in order to improve the cure rate of the rubber blend without significantly affecting scorch safety. More specifically, the present invention discloses a fast curing rubber blend comprising: (a) from 50 to 98 weight percent of at least one polydiene rubber, and (b) from 2 to 50 weight percent of at least one vinylpyridine copolymer comprised of a diene monomer and vinylpyridine wherein from 1 to 75 weight percent of the repeat units in said copolymer are derived from vinylpyridine. Preferably, the product of the weight fraction of said vinylpyridine copolymer in said rubber blend and the weight fraction of repeat units derived from vinylpyridine in said vinylpyridine copolymer is between 0.001 and 0.1.

Surprisingly, the vinylpyridine copolymers, when blended with polydiene rubber, yield improved traction. The amount of the vinylpyridine units in the copolymer is generally from about 1 to about 75 percent by weight with the remaining units being made from one or more diene monomers. The vinylpyridine-conjugated diene copolymer serves as a replacement for the polydiene rubber as up to about 50 parts by weight for every 100 parts by weight of the total weight of the rubber blend. In the case of a tire tread, should the remaining portion of the tire tread rubber contain high amounts of an otherwise good traction material such as styrene as in styrene-butadiene rubber, the amount of the vinylpyridine copolymer can be reduced even further.

DETAILED DESCRIPTION OF THE INVENTION

Vinylpyridine copolymers can be blended into polydiene rubbers in order to make the polydiene rubber cure faster. The polydiene rubbers which can be utilized in the blends of this invention include natural rubber and homopolymers made by polymerizing diene monomers, such as butadiene, isoprene, piperylene, and the like. Copolymers of one or more diene monomers can also be utilized as the polydiene rubber in the blends of this invention. The polydiene rubbers utilized in such blends can also be copolymers or terpolymers of diene monomers with one or more other ethylenically unsaturated monomers. Some representative examples of ethylenically unsaturated monomers that can potentially be utilized in the polydiene rubbers of such blends include alkyl acrylates having approximately 2 to 10 carbon atoms, such as methyl acrylate, ethyl acrylate, butyl acrylate, methyl methacrylate and the like; vinylidene monomers having one or more terminal $CH_2=C\{$ groups having approximately 2 to 10 carbon atoms; vinyl aromatics such as styrene, $\alpha$-methylstyrene, bromostyrene, chlorostyrene, fluorostyrene and the like having from 8 to 20 carbon atoms, $\alpha$-olefins having approximately 2 to 10 carbon atoms such as ethylene, propylene, 1-butene, and the like; vinyl halides having approximately 2 to 10 carbon atoms, such as vinylbromide, chloroethene (vinylchloride), vinylfluoride, vinyliodide, 1,2-dibromoethene, 1,1-dichloroethene (vinylidene chloride), 1,2-dichloroethene, and the like;

vinyl esters having approximately 2 to 10 carbon atoms such as vinyl acetate; α,β-olefinically unsaturated nitriles having approximately 2 to 10 carbon atoms, such as acrylonitrile and methacrylonitrile; α,β-olefinically unsaturated amides having approximately 2 to 10 carbon atoms, such as acrylamide, N-methyl acrylamide, N,N-dimethylacrylamide, methacrylamide and the like. The polydiene rubbers which are copolymers of one or more diene monomers with one or more other ethylenically unsaturated monomers will normally contain from about 50 weight percent to about 99 weight percent diene monomers and from about 1 weight percent to about 50 weight percent of the other ethylenically unsaturated monomers in addition to the diene monomers. For example, copolymers of diene monomers with vinylaromatic monomers, such as styrene-butadiene rubber (SBR) which contain from 50 to 95 weight percent diene monomers and from 5 to 50 weight percent vinylaromatic monomers are useful in many applications.

The vinylpyridine copolymers which are utilized in the blends of this invention are comprised of repeat units which are derived from a diene monomer and vinylpyridine. Such copolymers can contain repeat units which are derived from more than one type of diene monomer as well as other ethylenically unsaturated monomers in addition to the diene monomers. From 1 to 75 weight percent of the repeat units in such vinylpyridine copolymers will be derived from vinylpyridine. Such repeat units have the structural formula

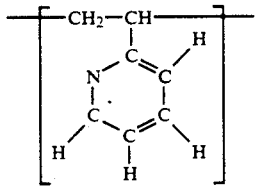

and differ from the vinylpyridine monomer from which they were derived in that the vinyl double bond was consumed in the polymerization.

From 25 to 99 weight percent of the repeat units in such vinylpyridine copolymers are derived from diene monomers and other ethylenically unsaturated monomers in addition to diene monomers and vinylpyridine. For example, the vinylpyridine copolymer can be a copolymer containing 50 percent butadiene and 50 percent vinylpyridine (having 50 percent of its repeat units being derived from vinylpyridine) which can be represented by the structural formula

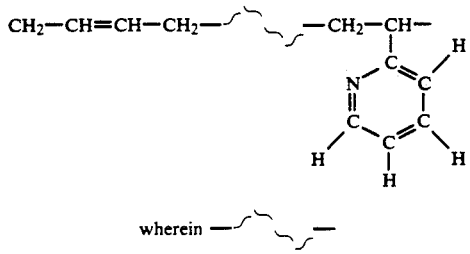

indicates that the repeat units derived from butadiene and vinylpyridine can be in any order. The structural formula shown above illustrates the polymer produced when there has been 1,4 addition of the butadiene. The vinylpyridine copolymer will preferably have 3 percent to 30 percent by weight of its repeat units being derived from vinylpyridine and from 70 to 97 weight percent of its repeat units being derived from diene monomers and other ethylenically unsaturated monomers. Most preferably, the vinylpyridine copolymer will contain from 4 to 10 weight percent vinylpyridine and from 90 to 96 weight percent diene monomers.

The fast curing blends of this invention will normally contain from 50 to 98 weight percent of at least one polydiene rubber and from 2 to 50 weight percent of at least one vinylpyridine copolymer (based upon the total rubber in the blend). Preferably, such blends will be comprised of from 55 to 96 weight percent of one or more polydiene rubbers and from 4 to 45 weight percent of one or more vinylpyridine copolymers. Most preferably, the fast curing blends of this invention will be comprised of from 60 to 85 weight percent polydiene rubbers and from 15 to 40 weight percent vinylpyridine copolymers.

As a general rule, the overall concentration of repeat units derived from vinylpyridine constitutes from about 0.1 to about 10 weight percent of the rubber blend (0.001 to 0.1 as a weight fraction). In other words, the product of the weight fraction of vinylpyridine copolymer in the rubber blend and the weight fraction of repeat units derived from vinylpyridine in the vinylpyridine copolymer will generally range between 0.001 and 0.1 (that is, between 0.1 and 10 weight percent). For example, if the vinylpyridine copolymer contains 5 weight percent vinylpyridine and there is 30 weight percent of that vinylpyridine copolymer in the rubber blend, then the product of the weight fraction of said vinylpyridine copolymer in said rubber blend and the weight fraction of repeat units derived from vinylpyridine in said vinylpyridine copolymer is 0.015, that is, 1.5%. Preferably, the product of the weight fraction of said vinylpyridine copolymer in said rubber blend and the weight fraction of repeat units derived from vinylpyridine in said vinylpyridine copolymer will range between 0.005 and 0.05. More preferably, this product will range between 0.01 and 0.03, (that is, between 1 percent and 3 percent).

Even though vinylpyridine copolymers which are derived from a wide variety of different monomers can be blended with polydiene rubbers in order to improve the cure characteristics of the polydiene rubber in the resultant blend, it is preferable to utilize a vinylpyridine copolymer which is compatible with the polydiene rubber in the blend. For example, if the polydiene rubber in the blend is polybutadiene, it would be preferable to utilize a copolymer of vinylpyridine and butadiene as the vinylpyridine copolymer in the blend. If the polydiene rubber utilized in the blend is a styrene butadiene rubber, then it is preferable to utilize a terpolymer of butadiene, styrene, and vinylpyridine as the vinylpyridine copolymer in the blend. In order to optimize compatibility, it is often desirable to utilize the same relative ratio of monomers in the vinylpyridine copolymer as is present in the polydiene rubber.

The polydiene rubbers and the vinylpyridine copolymers utilized in the blends of this invention can be prepared using polymerization techniques well known to persons skilled in the art. In most cases, these polymers will be prepared using emulsion polymerization techniques. A wide variety of polydiene rubbers which are suitable for use in the blends of this invention are commercially available. For example, The Goodyear Tire & Rubber Company sells nitrile rubber (NBR) under the trade name Chemigum TM, styrene butadiene rubber (SBR) under the trade name Plioiflex TM, polybutadiene under the trade name Budene TM, and synthetic polyisoprene under the name Natsyn TM; Exxon Chemical Americas sells ethylene propylene diene rubber (EPDM) under the trade name Vistalon TM and polyisobutylene under the trade name Vistanex TM and natural rubber is sold by a number of suppliers.

Typical levels of conventional accelerators should be added to the fast curing rubber blends of this invention. Such rubber blends can additionally contain other conventional compounding ingredients such as carbon black, sulfur, fillers, oils, waxes, colorants, scorch inhibiting agents, and processing aids.

In most cases, the fast curing rubber blends of this invention will consist of (a) at least one polydiene rubber, (b) at least one vinylpyridine copolymer, (c) sulfur and/or a sulfur containing compound, (d) at least one filler, (e) at least one accelerator, (f) at least one antidegradant, (g) optionally at least one processing oil (h) zinc oxide, (i) optionally a tackifier resin, (j) optionally a reinforcing resin, (k) optionally one or more fatty acids, (l) optionally a peptizer, and (m) optionally one or more scorch inhibiting agents. The fast curing rubber blend will normally contain from 0.5 to 5 phr (parts per 100 parts of rubber) of sulfur and/or a sulfur containing compound with 1 to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils are optionally included in the blend in amounts ranging from 0 to 120 phr, from 2 to 100, with amounts ranging from 5 to 50 phr being preferred. The fast curing blends of this invention will also normally contain from 0.5 to 10 phr of zinc oxide with 1 to 5 phr being preferred. These blends can optionally contain from 0 to 10 phr of a tackifier resin, 0 to 10 phr of reinforcing resins, 1 to 10 phr of fatty acids, 0 to 2.5 phr of peptizers, and 0 to 1 phr of scorch inhibiting agents.

The fast curing rubber blends of this invention do not contain significant amounts (more than about 0.01 phr of dicumyl peroxide or lead oxide). In most cases the rubber blends of this invention will not contain any dicumyl peroxide or lead oxide.

Such fast curing rubber blends can be prepared by simply blending or mixing together the polydiene rubber and the vinylpyridine copolymer. This blending can be accomplished utilizing compounding techniques well known to persons skilled in the art. For example, the polydiene rubber can be mixed with the vinylpyridine copolymer in a Banbury mixer or on a mill mixer to produce a blend of the polydiene rubber with the vinylpyridine copolymer. Such a blend could also be made by mixing a polydiene rubber latex with a vinylpyridine copolymer latex followed by coagulating the mixed latexes. The technique used in the preparation of the blend is not important as long as there is a thorough mixing of the vinylpyridine copolymer throughout the polydiene rubber.

Fast curing rubber blends can be prepared in a manner so that they have essentially the same physical and chemical properties as the polydiene rubber utilized in them, except of course, for the greatly improved cure properties of the blends. In other words, vinylpyridine copolymers can be blended with diene rubbers to produce blends having improved cure characteristics which have mechanical and chemical properties which are much like those of the diene rubber. In order to minimize the differences in the properties between a diene rubber and a fast curing rubber blend, it will generally be desirable to utilize a vinylpyridine copolymer which is compatible with and which has properties which are similar to those of the diene rubber. For example, the incorporation of vinylpyridine into a polymer will change its glass transition temperature, and it may be desirable to incorporate greater or lesser amounts of other monomers into such vinylpyridine copolymers in order to compensate for this tendency for the vinylpyridine copolymer to have a different glass transition temperature than its vinylpyridine-free counterpart. In any case, since the vinylpyridine copolymer represents only a minority of the fast curing blend, its influence on the overall properties of the blend is minimized and is normally not at all detrimental. This is in contrast to the situation wherein a small amount of vinylpyridine is copolymerized into a rubber in order to improve its cure properties.

In many cases, it is desirable to improve the cure rates of conventional rubber blends. For example, it may be desirable to improve the cure rate of a blend of medium vinyl polybutadiene and high cis-polybutadiene. In such cases, one of the components in the blend can be modified by copolymerizing vinylpyridine into it. Of course, vinylpyridine copolymers can also be added to such blends as a third component in order to improve the cure rate of the blend without reducing its scorch safety.

This invention is illustrated by the following examples which are merely for the purpose of illustration and are not to be regarded as limiting the scope of the invention or manner in which it may be practiced. Unless specifically indicated otherwise, parts and percentages are given by weight.

EXAMPLE 1

A blend containing 70 weight percent medium-vinyl polybutadiene and 30 weight percent of an emulsion polymerized copolymer of butadiene and vinylpyridine was prepared. The vinylpyridine copolymer utilized in this blend was prepared by standard emulsion polymerization techniques utilizing a 5 weight percent charge of vinylpyridine and had a Mooney (ML/4@100° C.) of 60. The polymer blend was mixed with carbon black, processing oil, waxes and antioxidant in the laboratory BR Banbury. A standard cure recipe containing zinc oxide, stearic acid, sulfur and accelerators was included during a final Banbury mix. The cure rate of this blend composition was then determined using a Monsanto rheometer. The cure time, $t_{90}$, to reach 90 percent of complete cure was determined to be 12.5 minutes, and the scorch time, $t_2$, to reach a 2 point rise on the rheometer curve from the minimum value was determined to be 5.8 minutes. A repeat of this experiment with a separate Banbury mix gave a $t_{90}$ value of 13.5 minutes and a $t_2$ of 6.0 minutes.

EXAMPLE 2

The procedure described in Example was repeated except that an emulsion polymerized polybutadiene having a Mooney of 66 was substituted for the vinylpyridine copolymer utilized in Example 1. In this experiment, $t_{90}$ was determined to be 20.5 minutes and $t_2$ was determined to be 5.3 minutes. A repeat of this experiment with a separate Banbury mix gave a $t_{90}$ value of 21.5 minutes and a $t_2$ of 6.5 minutes.

EXAMPLE 3

The procedure described in Example was repeated except that Budene TM 1207 was substituted for the vinylpyridine copolymer. Budene TM 1207 is a synthetic solution polymerized polybutadiene. In this experiment, $t_{90}$ was determined to be 19.0 minutes and $t_2$ was determined to be 6.5 minutes. A repeat of this experiment with a separate Banbury mix gave a $t_{90}$ value of 17.5 minutes with t2 being determined to be 6.3 minutes.

EXAMPLE 4

The procedure described in Example was repeated except that an emulsion polymerized polybutadiene having a Mooney of 42 was substituted for the vinylpyridine copolymer utilized in Example 1. In this experiment, $t_{90}$ was determined to be 24.0 minutes and $t_2$ was determined to be 6.5 minutes. A repeat of this experiment with a separate Banbury mix gave a $t_{90}$ value of 22.5 minutes and a $t_2$ of 6.5 minutes.

EXAMPLE 5

A blend containing 70 weight percent of emulsion polymerized SBR 1712 and 30 weight percent of an emulsion polymerized copolymer of butadiene and vinylpyridine was prepared. The vinylpyridine copolymer utilized in this blend contained a 5 weight percent charge of vinylpyridine and was oil extended with 25 parts per hundred of rubber with an aromatic oil. The oil extended Mooney was 54. The polymer blend was mixed with carbon black, processing oil, waxes and antioxidant in a laboratory BR Banbury. A standard cure recipe containing zinc oxide, stearic acid, sulfur and accelerators was included during a final Banbury mix. The cure rate of this blend composition was then determined using a Monsanto rheometer. In this experiment, $t_{90}$ was determined to be 13.7 minutes and $t_2$ was determined to be 6.5 minutes. A repeat of this experiment with a separate Banbury mix gave a $t_{90}$ value of 14.5 minutes and a $t_2$ of 6.8 minutes.

EXAMPLE 6

The procedure described in Example 5 was repeated except that an oil extended emulsion polybutadiene (25 phr aromatic oil, Mooney=62) was substituted for the vinylpyridine copolymer utilized in Example 5. In this experiment, $t_{90}$ was determined to be 21.4 minutes and $t_2$ was determined to be 7.3 minutes. A repeat of this experiment with a separate Banbury mix gave a $t_{90}$ value of 23.5 minutes and a $t_2$ of 7.3 minutes.

EXAMPLE 7

The procedure described in Example 5 was repeated except that an oil extended solution polybutadiene (25 phr aromatic oil, Mooney=50) was substituted for the vinylpyridine copolymer utilized in Example 5. In this experiment, $t_{90}$ was determined to be 17.8 minutes and $t_2$ was determined to be 6.0. A repeat of this experiment with a separate Banbury mix gave a $t_{90}$ value of 20.3 minutes and a $t_2$ of 7.0 minutes.

EXAMPLE 8

The procedure desoribed in Example 5 was repeated except that an oil extended emulsion polymerized copolymer of butadiene and vinylpyridine (25 phr aromatic oil, 5 weight percent charge of vinylpyridine, Mooney=66) was substituted for the vinylpyridine copolymer utilized in Example 5. In this experiment, $t_{90}$ was determined to be 15.0 minutes and $t_2$ was determined to be 7.0 minutes. A repeat of this experiment with a separate Banbury mix gave a $t_{90}$ value of 14.5 minutes and a $t_2$ of 6.8 minutes.

The rheometer data for Examples 1-8 is summarized in Table I. It is very apparent that the cure rate of the blends which contained vinylpyridine copolymers (Examples 1, 5 and 8) was much better (faster) than it was in the controls (Examples, 2, 3, 4, 6 and 7) wherein a vinylpyridine copolymer was not included in the blend. It is also very clear that the scorch safety of the blends containing vinylpyridine copolymers do not differ substantially from that of the controls.

TABLE I

| | Rheometer Data | | | |
|---|---|---|---|---|
| Example | Maximum Torque | Minimum Torque | $T_{90}$ Minutes | $T_2$ Minutes |
| 1 | 36.5 | 10.2 | 12.5 | 5.8 |
|   | 36.9 | 10.5 | 13.5 | 6.0 |
| 2 | 35.3 | 10.2 | 20.5 | 5.3 |
|   | 35.0 | 10.5 | 21.5 | 6.5 |
| 3 | 36.5 | 10.2 | 19.0 | 6.5 |
|   | 36.0 | 10.3 | 17.5 | 6.3 |
| 4 | 35.0 | 9.8 | 24.0 | 6.5 |
|   | 35.2 | 9.6 | 22.5 | 6.5 |
| 5 | 29.6 | 7.8 | 13.7 | 6.5 |
|   | 29.8 | 7.9 | 14.5 | 6.5 |
| 6 | 28.0 | 8.4 | 21.5 | 7.3 |
|   | 28.1 | 8.3 | 23.5 | 7.3 |
| 7 | 30.4 | 8.2 | 17.8 | 6.0 |
|   | 30.0 | 7.8 | 20.3 | 7.0 |
| 8 | 29.4 | 7.9 | 15.0 | 7.0 |
|   | 29.8 | 7.9 | 14.5 | 6.8 |

According to another embodiment of the present invention, it has been unexpectedly found that the above-noted copolymers of vinylpyridine-butadiene impart improved traction to rubber compounds and articles made therefrom such as tires, e.g. tire treads, and the like. Generally, the above-noted copolymer of vinylpyridinebutadiene can be utilized in association with any type of the above-noted rubbers. Thus, the polydiene rubbers listed herein above are hereby fully incorporated by reference and can be made from conjugated dienes having from 4 to 12 carbon atoms and preferably from 4 to 8 carbon atoms, or interpolymers thereof, with specific monomer examples including butadiene, isoprene, 2,3-dimethyl-1,3-butadiene, 2-methyl-1,3-pentadiene, pentadiene, hexadiene, 4,5-diethyl-1,3-octadiene, phenyl-1,3-butadiene, and the like. Rubbers made from butadiene and isoprene are preferred. The polyisoprene can be of any microstructure, for example cis, trans or vinyl, and the like. Desirably, the polyisoprene can either be derived from natural or synthetic sources and generally have a high cis content generally in excess of 70 percent, desirably in excess of 80 percent, and preferably in excess of 90 percent of the total cis, trans, and vinyl groups therein.

The copolymers made from conjugated diene monomers and vinyl substituted aromatics are the same as set forth hereinabove and are thus fully incorporated by reference. Such copolymers are generally made from conjugated dienes as noted above, that is having from 4 to 12 carbon atoms and preferably from 4 to 8 carbon atoms with the vinyl substituted aromatic monomers having from 8 to about 20 carbon atoms such as styrene, α-methylstyrene, t-butyl styrene, and the like, with styrene being preferred. Still another rubber which can be utilized is polychloroprene.

Butyl and halobutyl rubber can also be used. The most common commercially available butyl rubbers, are generally copolymers of isobutylene with a small amount of isoprene. Ethylene-propylene-diene (EPDM) rubber, can also be used in the present invention. EPDM is a terpolymer formed from ethylene, propylene, and a nonconjugated diene monomer such as methyl or ethyl norbornene, and the like.

The above polydiene rubbers are commercially available and well known to the art as well as to the literature.

The vinylpyridine-butadiene copolymers which are utilized in the present embodiment to improve the traction of various conventional rubbers are generally the same random vinylpyridine copolymers set forth hereinabove and thus are fully incorporated by reference. As noted above, such copolymers are made from monomers of vinylpyridine with one or more diene comonomers. The diene comonomers generally contain from 4 to 12 carbon atoms with specific examples including isoprene, hexadiene, 2,3-dimethyl-1,3-butadiene, 2-methyl-1,3-pentadiene, and the like with butadiene being preferred. Although more than one diene monomer can be utilized, desirably only one diene monomer is utilized in the copolymerization with vinylpyridine. The amount of the vinylpyridine repeat units in the copolymer is generally from about 1 to about 75 percent by weight, desirably from about 10 to about 50 percent by weight and preferably from about 30 to about 40 percent by weight. Accordingly, the amount of the diene repeat units in the copolymer is generally from about 25 to about 99 percent by weight, more desirably from about 50 to about 90 percent by weight, and preferably from about 60 to about 70 percent by weight. Other optional monomers can also be utilized for the preparation of the vinylpyridine copolymer as noted above such as various vinyl substituted aromatic monomers having from 8 to about 12 carbon atoms, as for example, styrene, alphamethylstyrene, t-butyl styrene, and the like. The amount of repeat units within the vinylpyridine copolymer derived from the optional comonomer is generally up to about 30 percent by weight and preferably up to about 15 percent by weight. The amount of such optional comonomers generally replaces the amount of the diene repeat unit within the vinylpyridine copolymer.

The amount of the vinylpyridine copolymer utilized with the above noted rubber polymers generally is from about 1 to about 50 parts by weight, desirably from about 2 to about 30 parts by weight, and preferably from about 5 to about 15 parts by weight based upon 100 total parts by weight of the rubber blend, that is the blend of the vinylpyridine copolymer and the above-noted polydiene rubbers.

The vinylpyridine random copolymer of the present invention is generally prepared in a conventional manner utilizing emulsion polymerization, as noted above. The addition of the vinylpyridine copolymer to the rubber polymer increases the hysteresis of the rubber composition and results in an increase in traction. An advantage of utilization of the vinylpyridine copolymer is that the amount of the accelerator can be reduced since the vinylpyridine copolymer such as vinylpyridine-butadiene tends to activate cure.

The rubber polymer-vinylpyridine blends of the present invention can contain various conventional additives such as carbon black, sulfur, various oils, waxes, processing aids, scorch-inhibiting agents, and the like. The various types of additives which are desired, as well as the amounts of all of the various compound ingredients, are generally the same as set forth hereinabove and which are fully incorporated herein by reference. Thus, the rubber blends of the present invention will generally contain, or consist of, (a) at least one polydiene rubber, (b) at least one vinylpyridine copolymer, (c) sulfur and/or a sulfur containing compound, (d) at least one filler, (e) at least one accelerator, (f) at least one antidegradant, (g) optionally at least one processing oil (h) zinc oxide, (i) optionally a tackifier resin, (j) optionally a reinforcing resin, (k) optionally one or more fatty acids, (1) optionally a peptizer, and (m) optionally one or more scorch inhibiting agents. The fast curing rubber blend will normally contain from 0.5 to 5 phr (parts per 100 parts of rubber) of sulfur and/or a sulfur containing compound with 1 to 2.5 phr being preferred. It may be desirable to utilize insoluble sulfur in cases where bloom is a problem.

The present embodiment as with the above embodiment does not contain significant amounts, i.e., more than 0.01 phr, of dicumyl peroxide or lead oxide. In fact, the rubber blends typically do not contain any dicumyl peroxide or lead oxide.

The rubber blends of the present invention including the various additives and fillers can be prepared in the same manner as set forth hereinabove and the description thereof is thus hereby fully incorporated by reference.

The rubber blends of the present invention have unexpectedly been found to improve traction and thus can be utilized wherever improved traction is desired. A particularly preferred area of use is in tires (i.e. tire treads) including passenger vehicles, race or high performance vehicles, light to medium trucks, and the like. The unexpected improved tear resistance, allows the invention to also be useful on tires for off-the-road vehicles.

The invention will be better understood by reference to the following examples.

EXAMPLE 9

An emulsion copolymer containing 40 weight percent vinyl pyridine and 60 weight percent butadiene was prepared by standard emulsion polymerization techniques in a manner as described in Example 1. This copolymer was blended with varying amounts of base rubbers including isoprene rubber, SBR, and BR. The various ingredients as set forth in Table II were blended in a Banbury in a conventional manner well known to the art and to the literature.

Cure properties were determined using a Monsanto oscillating disk rheometer which was operated at a temperature of 150° C. and at a frequency of 11 hertz. A description of oscillating disc rheometers can be found in the Vanderbilt Rubber Handbook edited by Robert O. Babbit (Norwalk, Conn., R. T. Vanderbilt Company, Inc., 1978), pages 583–591. The use of this cure meter and standardized values read from the curve are specified in ASTM D-2084. A typical cure curve obtained on an oscillating disc rheometer is shown on page 588 of the 1978 edition of the Vanderbilt Rubber Handbook.

Peel adhesion testing was done to determine the interfacial adhesion between various rubber formulations that were prepared. Teh interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing.

The dynamic mechanical properties of the cured rubber were measured in tension over a range of temperatures using an Autovibron Dynamic Viscoelastometer from Imass, Inc., Hingham, Mass. 02018. The cured rubber is subject to an applied tensile deformation at 0.1 percent strain and 11 Hz frequency over the desired temperature range. The measured viscoelastic response is used in determining the storage modulus, E', which is a measure of energy stored and recovered in cyclic deformation and loss modulus, E'', which is a measure of energy dissipated as heat. Tan delta is determined by the ratio of E''/E'. Tan delta is a measure of hysteresis.

Physical properties of the various blend recipes were determined and are summarized in Table II. As can be seen in Table III, the percent rebound decreases, and the tan delta at 0° C. as measured on the Autovibron Dynamic Viscoelastometer as previously described, has increased with the addition of the VPBR copolymer. The decrease in rebound and increase in tan delta at 0° C. which represent an increase in hysteresis, are expected to provide increased traction when used in a tire tread composition.

TABLE II

VINYL PYRIDINE (40%)/BD COPOLYMER TO IMPROVE TRACTION

| COMPOUND | 1 | 2 | 3 | 4 | 5 |
|---|---|---|---|---|---|
| Synthetic Cis-1,4-Polyisoprene | 100.00 | 95.00 | 90.00 | 90.00 | 75.00 |
| VP-BD Copolymer | 0.0 | 5.00 | 10.00 | 10.00 | 10.00 |
| Synthetic High Cis-1,4-Polybutadiene | — | — | — | — | 15.00 |
| Sulfenamide Accelerator | 0.80 | 0.80 | 0.80 | 0.40 | 0.80 |
| Diphenyl Guanidine (DPG) | 0.40 | 0.40 | 0.40 | — | 0.40 |
| Carbon Black | 45 | 45 | 45 | 45 | 45 |
| Processing Oil | 9 | 9 | 9 | 9 | 9 |
| Antioxidant/Antiozonant | 3 | 3 | 3 | 3 | 3 |
| Wax | 1 | 1 | 1 | 1 | 1 |
| Sulfur | 1.60 | 1.60 | 1.60 | 1.60 | 1.60 |
| Fatty Acid | 3 | 3 | 3 | 3 | 3 |
| Zinc Oxide | 3 | 3 | 3 | 3 | 3 |

TABLE III

PHYSICAL PROPERTIES* USING VP/BR COPOLYMER

| | 1 | 2 | 3 | 4 | 5 |
|---|---|---|---|---|---|
| RHEOMETER 100 CPM, 1 DEG AT 150° C. | | | | | |
| S* MIN | 9.6 | 10.0 | 10.2 | 9.8 | 10.3 |
| S* MAX | 36.0 | 32.4 | 31.6 | 29.4 | 34.0 |
| DELTA TORQUE | 26.4 | 22.4 | 21.4 | 28.6 | 23.7 |
| T(1) | 4.8 | 3.3 | 3.0 | 4.3 | 3.1 |
| TC25 | 6.0 | 3.9 | 3.6 | 5.5 | 3.8 |
| TC50 | 6.9 | 4.8 | 4.4 | 6.7 | 4.5 |
| TC90 | 10.5 | 7.6 | 6.7 | 9.5 | 7.0 |
| Best Cure Time (Min) | 10 | 7 | 7 | 10 | 7 |
| MODULUS-ASTM D 412 300% MODULUS (MPa) | 7.5 | 7.6 | 8.0 | 7.8 | 7.9 |
| TENSILE (MPa) | 25.0 | 22.5 | 20.8 | 19.8 | 22.5 |
| ELONGATION (%) | 655 | 635 | 580 | 590 | 655 |
| REBOUND (ASTM 1054) BC + 10'/150° C. (% REBOUND) | | | | | |
| 0° C. | 42.0 | 36.5 | 31.0 | 31.0 | 33.5 |
| 23° C. | 58.0 | 47.0 | 42.0 | 41.5 | 43.5 |
| 100° C. | 74.5 | 60.0 | 57.0 | 56.5 | 58.5 |
| PEEL ADHESION) (95° C.) TO SELF (N/cm) | 35 | 93 | 78 | 33 | 80 |
| HOT TENSILE (93° C.) (MPa) | | | | | |
| 300% MOD | 2.9 | 2.8 | 3.1 | 3.1 | 3.2 |
| TENSILE | 16.6 | 16.4 | 15.9 | 14.1 | 16.1 |
| ELONGATION | 803 | 840 | 810 | 765 | 840 |

*Cure conditions are Best Cure (BC) Time @ 150° C., unless otherwide noted.

Passenger tires were formed using a typical tread recipe containing a 70 percent blend of emulsion SBR and 30 percent of high cis-1,4- polybutadiene. The emulsion vinylpyridine-co-butadiene polymer (E-VPBR) was evaluated at 2.5 phr and 5.0 phr as a replacement for an equivalent quantity of SBR. The ingredients of the typical tread recipe included sulfur accelerators, carbon black, processing oils, antioxidants and antiozonates, waxes, fatty acids, zinc oxide, and other compound ingredients known to those skilled in the art and the literature. Ingredients were mixed in a conventional manner in a Banbury mixer.

The physical properties exhibited by these formulations are shown in Table IV.

TABLE IV

LABORATORY PHYSICAL PROPERTIES

| | A | B | C |
|---|---|---|---|
| COMPOUND | | | |
| emulsion SBR[1] | 96.25 | 92.81 | 89.38 |
| high cis BR[2] | 37.50 | 37.50 | 37.50 |
| E-VPBR | — | 2.50 | 5.00 |
| RHEOMETER | | | |
| S* MIN | 7.8 | 7.9 | 7.9 |
| S* MAX | 31.4 | 32.6 | 31.9 |
| Ts(1) | 6.2 | 6.3 | 6.3 |
| T25 | 7.9 | 7.9 | 7.7 |
| T90 | 17.4 | 12.8 | 11.7 |
| STRESS-STRAIN DATA (ASTM D 412) (MPa) | | | |
| 300% MODULUS | 7.2 | 7.6 | 7.6 |
| TENSILE | 17.6 | 18.2 | 16.5 |
| ELONGATION | 610 | 600 | 580 |
| REBOUND (ASTM 1054) (%) | | | |
| 23° C. | 40.5 | 39.0 | 37.0 |
| 100° C. | 60.5 | 56.0 | 52.0 |
| PEEL ADHESION (95° C.) (N/cm) To Itself | 79 | 87 | 132 |

[1] 70 phr of 23.5% Styrene emulsion SBR which contained 37.5 phr hydrocarbon extending oil
[2] 30 phr of high Cis-1,4-BR which contained 25 phr hydrocarbon extending oil
*Cure conditions are 18' at 150° C., except for rebound which is 128' at 150° C.

While in accordance with the Patent Statutes, the best mode and preferred embodiment has been set forth, the scope of the invention is not limited thereto, but rather by the scope of the attached claims. by weight of said polydiene rubber and said vinylpyridine copolymer.

What is claimed is:

1. A cured rubber article having improved traction characteristics, comprising:
   a blended rubber article cured in a mold, said cured blended rubber article comprising from about 50 to about 98 parts by weight of a polydiene rubber and from about 2 to about 50 parts by weight of a vinylpyridine copolymer, said vinylpyridine copolymer made from
   (a) a vinylpyridine monomer
   (b) one or more diene comonomers having a total of from 4 to 12 carbon atoms, and
   from about 1 to about 75 percent by weight of said vinylpyridine copolymer containing repeat units which are derived from said vinylpyridine monomer, from about 25 percent to about 99 percent by weight of said vinylpyridine copolymer containing repeat units which are derived from said one or more diene monomers, and
   wherein said cured rubber blend does not contain a significant amount of dicumyl peroxide or lead oxide.

2. A cured rubber article having improved traction characteristics according to claim 1, optionally including a vinyl substituted aromatic monomer with said one or more diene comonomers, and wherein said vinyl substituted monomer is styrene, alphamethyl styrene, or t-butyl styrene.

3. A cured rubber article having improved traction characteristics according to claim 2, wherein said polydiene rubber is polybutadiene, polyisoprene, a copolymer of butadiene and styrene, a copolymer of butadiene and isoprene, a copolymer of styrene and isoprene, or a terpolymer of styrene, isoprene and butadiene.

4. A cured rubber article having improved traction characteristics according to claim 3, wherein from about 10 to about 50 percent by weight of said vinylpyridine copolymer containing repeat groups are derived from vinylpyridine monomers and wherein from about 50 percent to about 90 percent by weight of said vinylpyridine copolymer containing repeat units are derived from said one or more dienes and said optional vinyl substituted aromatic.

5. A cured rubber article having improved traction characteristics according to claim 4, wherein the amount of said vinylpyridine copolymer is from about 2 parts to about 30 parts by weight per 100 parts by weight of said polydiene rubber and said vinylpyridine copolymer.

6. A cured rubber article having improved traction characteristics according to claim 5, wherein said vinylpyridine copolymer is a copolymer made from vinylpyridine and butadiene.

7. A cured rubber article having improved traction charactertistics according to claim 6, wherein from about 30 to 40 percent by weight of said vinylpyridine copolymer containing repeat groups are derived from vinylpyridine monomers and wherein from about 60 percent to about 70 percent by weight of said vinylpyridine copolymer containing repeat units are derived from said one or more dienes and said optional vinyl substituted aromatic.

8. A cured rubber article having improved traction characteristics according to claim 7, wherein the amount of said vinylpyridine copolymer is from about 5 parts to about 15 parts by weight per 100 parts by weight of said polydiene rubber and said vinylpyridine copolymer.

9. A cured rubber article according to claim 1, wherein the rubber article is the tread portion of a tire.

10. A cured rubber article according to claim 4, wherein the rubber article is the tread portion of a tire.

11. A cured rubber article according to claim 8, wherein the rubber article is the tread portion of a tire.

12. A fast curing rubber blend consisting of:
   (a) from 50 to 98 weight percent of at least one polydiene rubber, based upon the total weight of the rubber in the blend,
   (b) from 2 to 50 weight percent of at least one vinylpyridine copolymer comprised of repeat units which are derived from a diene monomer and vinylpyridine, based upon the total weight of the rubber in the blend, wherein from 1 to 75 weight percent of the repeat units in said vinylpyridine copolymer are derived from vinylpyridine; wherein the product of the weight fraction of vinylpyridine copolymer in said rubber blend and the weight fraction of repeat units derived from vinylpyridine in said vinylpyridine copolymer is between about 0.001 to about 0.1,
   (c) sulfur and/or a sulfur containing compound,
   (d) at least one rubber composition filler,
   (e) at least one accelerator,
   (f) at least one antidegradant,
   (g) zinc oxide
   (h) from 0 to 120 phr of a processing oil,
   (i) from 0 to 10 phr of a tackifier resin,
   (j) from 0 to 10 phr of a reinforcing resin,
   (k) from 0 to 10 phr of one or more fatty acids,
   (l) from 0 to 2.5 phr of a peptizer, and
   (m) from 0 to 1 phr of one or more scorch inhibiting agents.

13. A curable rubber blend, comprising:
   from about 50 to about 98 parts by weight of a polydiene rubber and from about 2 to about 50 parts by weight of a vinylpyridine copolymer, said vinylpyridine copolymer made from
   (a) a vinylpyridine monomer, and
   (b) one or more diene comonomers having a total of from 4 to 12 carbon atoms, from about 1 to about 75 percent by weight of said vinylpyridine copolymer containing repeat units which are derived from said vinylpyridine monomers, from about 25 percent to about 99 percent by weight of said vinylpyridine copolymer containing repeat units which are derived from said one or more diene monomers, and wherein said blend does not contain a significant amount of dicumyl peroxide or lead oxide.

14. A curable composition according to claim 13, optionally including a vinyl substituted aromatic monomer with said one or more diene comonomers, and wherein said vinyl substituted aromatic monomer is styrene, alphamethyl styrene, or t-butyl styrene.

15. A curable composition according to claim 14, wherein said polydiene rubber is polybutadiene, polyisoprene, a copolymer of butadiene and styrene, a copolymer of butadiene and isoprene, a copolymer of styrene and isoprene, or a terpolymer of styrene, isoprene, and butadiene, and wherein from about 10 to about 50 percent by weight of said vinylpyridine copolymer containing repeat groups are derived from vinylpyridine monomers and wherein from about 50 percent to about 90 percent by weight of said vinylpyridine copolymer containing repeat units are derived from said one or more dienes and said optional vinyl substituted aromatic.

16. A curable composition according to claim 15, wherein the amount of vinylpyridine copolymer is from about 2 parts to about 30 parts by weight per 100 parts by weight of said polydiene rubber and said vinylpyridine copolymer, and wherein said vinylpyridine copolymer is a copolymer made from vinylpyridine and butadiene.

17. A curable composition as in claim 16, wherein from about 30 to about 40 percent by weight of said vinylpyridine copolymer containing repeat groups are derived from vinylpyridine monomers and wherein from about 60 percent to about 70 percent by weight of said vinylpyridine copolymer containing repeat units are derived from said one or more dienes and said optional vinyl substituted aromatic.

18. A process for forming a cured rubber article having improved traction characteristics, comprising the steps of:
  blending from about 50 to about 98 parts by weight of a polydiene rubber and from about 2 to about 50 parts by weight of a vinylpyridine copolymer to provide improved traction properties to said article, said vinylpyridine copolymer made from
  (a) vinylpyridine monomes, and
  (b) one or more diene comonomers having a total of from 4 to 12 carbon atoms,
  from about 1 to about 75 percent by weight of said vinylpyridine copolymer containing repeat units which are derived from said vinylpyridine monomers, from about 25 percent to about 99 percent by weight of said vinylpyridine copolymer containing repeat units which are derived from one or more diene monomers, and wherein said cured rubber blend does not contain a significant amount of dicumyl peroxide or lead oxide,
  forming a tire tread comprising said blend, and curing said tire tread.

* * * * *